United States Patent [19]

Träubel et al.

[11] 4,187,074

[45] Feb. 5, 1980

[54] WATER-SOLUBLE CATIONIC OLIGOURETHANE RESINS AND THE USE THEREOF FOR THE TREATMENT OF PELTS OR LEATHER

[75] Inventors: Harro Träubel; Dieter Dieterich, both of Leverkusen; Helga Heinze, Cologne, all of Fed. Rep. of Germany

[73] Assignee: Bayer Aktiengesellschaft, Bayerwerk, Fed. Rep. of Germany

[21] Appl. No.: 934,775

[22] Filed: Aug. 18, 1978

[30] Foreign Application Priority Data

Sep. 1, 1977 [DE] Fed. Rep. of Germany ....... 2739378

[51] Int. Cl.² ............................................. C03G 18/30
[52] U.S. Cl. .......................... 8/94.19; 260/29.2 TN; 521/158; 528/44; 528/48
[58] Field of Search .................... 528/44, 48; 521/158; 8/94.19; 260/29.2 TN

[56] References Cited

U.S. PATENT DOCUMENTS

| | | | |
|---|---|---|---|
| 3,480,592 | 11/1969 | Dieterich et al. | 528/71 |
| 3,535,274 | 10/1970 | Dieterich et al. | 528/71 |
| 4,106,897 | 8/1978 | Träubel et al. | 8/94.33 |

FOREIGN PATENT DOCUMENTS 1495598 12/1977 United Kingdom .

*Primary Examiner*—Maurice J. Welsh
*Attorney, Agent, or Firm*—Gene Harsh; Lawrence S. Pope

[57] ABSTRACT

This invention relates to water-soluble, cationic hydrophilic oligourethanes free from isocyanate groups and containing methylol groups and to the use thereof for the tanning, pre-tanning or re-tanning of pelts or pre-tanned leather and as dyeing auxiliaries.

10 Claims, No Drawings

WATER-SOLUBLE CATIONIC OLIGOURETHANE RESINS AND THE USE THEREOF FOR THE TREATMENT OF PELTS OR LEATHER

BACKGROUND OF THE INVENTION

In German Offenlegungsschrift No. 2,504,081 (British Pat. No. 1,495,598), there has been described a process for the tanning or re-tanning of pelts or leather, which is characterized in that pelts or leather are treated with an aqueous liquor containing:

(a) hydrophilic oligourethanes which may be methylolated and which have a molecular weight ($\overline{M}n$) of from 300 to 20,000; and, optionally, (b) formaldehyde or a substance from which formaldehyde is split off.

The oligourethanes described there are generally based on water-soluble polyethers having a molecular weight below 500 and they are preferably free from ionic groups. However, German Offenlegungsschrift No. 2,504,081 (British Pat. No. 1,495,598) also mentions oligourethanes which contain sulphonate groups and are based on hydrophobic, water-insoluble polyethers. It is expressly pointed out in this connection that the incorporation of ionic groups into the oligourethane resin should be considered in cases where hydrophobic polyhydroxyl compounds or combinations of hydrophobic with non-ionic, hydrophilic polyhydroxyl compounds are used for the synthesis of the oligourethane. As is well known to those skilled in the art, the incorporation of ionic centers enables even those oligourethanes to be dissolved in water which, in the absence of the ionic center, are neither soluble in water nor dispersable therein.

In the course of further development of the known process, it has now surprisingly been found that aqueous solutions of such oligourethane resins are greatly improved in the tanning and dyeing characteristics thereof, if, in addition to hydrophilic polyethylene glycol polyethers, they contain cationic centers obtained in known manner by the reaction of a tertiary nitrogen atom with a quaternizing agent and/or an acid.

It is found particularly advantageous to use the quaternizing agent and/or the acid in sub-equivalent quantities, based on the tertiary nitrogen, so that the pH of the resulting aqueous solution of the cationic oligourethane is between about 5 and 10, preferably between about 7 and 9.

The aqueous oligourethane solutions according to the present invention have the following advantages over solutions known in the art:

1. They have excellent resistance to electrolytes in spite of the cationic character thereof.
2. The anionic character of re-tanned chrome leather is over-compensated.
3. The products have a soft tanning effect.
4. The products may be used for pre-tanning without deleteriously affecting the subsequent chrome tanning.
5. The cationic oligourethane solutions improve the consumption of the anionic dyes and produce a more brilliant and more intense color without deleteriously affecting the levelling of the dyeing.

SUMMARY OF THE INVENTION

The present invention thus relates to water-soluble oligourethanes which contain methylol groups and are free from isocyanate groups and have a molecular weight ($\overline{M}n$) of between about 600 and 5,000 based on:

(a) polyethylene glycol ethers having a molecular weight ($\overline{M}n$) between about 400 and 1,500;

(b) polyisocyanates; and, optionally, (c) compounds which are mono- or poly-functional towards isocyanates, preferably alcohols, having a molecular weight below about 300; and (d) formaldehyde, characterized in that the proportion of component (a) in the oligourethane is from about 40 to 90%, by weight, preferably from about 60 to 80%, by weight, and in that component (a) and/or (c) together contain a total of from about 20 to 200 milliequivalents, preferably from about 30 to 100 milliequivalents, of tertiary nitrogen atoms per 100 g of oligourethane solids content, from about 20 to 95% of which tertiary nitrogen atoms, preferably from about 60 to 90% thereof, have been converted into quaternary ammonium nitrogen or into the ammonium salt form by treatment with alkylating agents and/or acids.

The present invention also relates to a process for tanning or re-tanning pelts or leather, characterized in that the pelts or leather are treated with an aqueous solution of the oligourethanes according to the present invention, which solution is at a pH of between about 5 and 10, preferably between about 7 and 9, and most preferably between about 7 and 8.

DETAILED DESCRIPTION OF THE INVENTION

The polyethylene glycol ethers used in the preparation of the oligourethane resins according to the present invention may be polyethers having an average functionality of from about 1.8 to 4, preferably from about 2 to 3, and a molecular weight ($\overline{M}n$) of from about 400 to 1,500. These polyethers may be obtained in known manner by the addition of ethylene oxide to starting components which contain reactive hydrogen atoms, such as alcohols, amines or water. Other epoxides may also be used in minor quantities, e.g. propylene oxide or butylene oxide, but the proportion thereof should always be below about 20%, preferably below about 10%. Pure polyethylene glycol polyethers which have an average molecular weight ($\overline{M}n$) between about 500 and 1,200 and form a clear solution in water are particularly preferred.

Polyethylene glycol polyethers which have been started on compounds, such as ammonia, primary amines or amino alcohols, and therefore contain tertiary amino groups are also particularly preferred. When such polyethers are used, the use of a low molecular weight tertiary amines as reactants may be dispensed with.

The polyisocyanates used may, in principle, be any aliphatic, cycloaliphatic, araliphatic, aromatic or heterocyclic polyisocyanates, such as those mentioned, for example, in German Offenlegungsschrift No. 2,504,081 (British Pat. No. 1,495,598). Aliphatic and cycloaliphatic polyisocyanates are preferred on account of the fastness to light thereof, in particular 1,6-diisocyanatohexane, 1,4-diisocyanatobutane and 1-isocyanato-3,3,5-trimethyl-5-isocyanatomethyl-cyclohexane. 1,6-diisocyanatohexane is particularly preferred. For the manufacture of leathers in dark colors or yellowish brown shades, products based on aromatic isocyanates may also be used. Particularly preferred aromatic polyisocyanates in such cases are 2,4- diisocyanatotoluene, 2,6-diisocyanatotoluene and isomeric mixtures thereof, 2,4'-diisocyanatodiphenyl methane and 4,4'-diisocyanatodiphenylmethane and isomeric mixtures thereof.

The mono- or poly-functional isocyanate reactive low molecular weight compounds which may be used in the synthesis of the oligourethanes according to the present invention in quantities of less than about 30% by weight, preferably less than about 15%, by weight, based on the oligourethane, include not only the known monohydric and polyhydric alcohols, such as ethylene glycol, diethylene glycol, 1,2- and 1,3-propylene glycol, dipropylene glycol, 1,4- and 2,3-butane diol, glycerol, trimethylol propane and 1,2,4-hexane triol, but especially also compounds which contain tertiary nitrogen atoms. Particularly suitable compounds of this type are basic monohydric and dihydric alcohols such as dimethylamino ethanol, dimethylamino propanol, diethylamino ethanol, diethylamino propanol, N-hydroxyethyl-pyrrolidine, N-hydroxyethyl-piperidine, N-methyl-diethanolamine, N-ethyl-diethanolamine and N-methyl-diisopropanolamine. Other suitable amino alcohols have been mentioned, for example, in German Offenlegungsschrift No. 1,770,068 (page 18) which corresponds to U.S. Pat. No. 3,756,992.

As isocyanate-reactive compounds there may also be used di-tertiary diamines in combination with a quaternizing agent which contains at least one Zerewitinoff active hydrogen atom in addition to the quaternizing group, for example bromoethanol, so that the polyisocyanate addition reaction is accompanied by a quaternizing polyaddition reaction in situ. A process of this type for the preparation of ionic isocyanate polyaddition products has been described, for example, in German Auslegeschrift No. 1,495,770 which corresponds to U.S. Pat. No. 3,535,274.

The following are examples of suitable di-tertiary diamines (which may, of course, also be fixed in the oligourethane molecule by subsequent reaction with quaternizing groups of the oligourethane): N,N'-tetramethyl-ethylene diamine, N,N'-tetramethyl-hexamethylene diamine, pentamethyl-diethylene triamine, pentamethyl-dipropylene triamine, N,N'-dimethylpiperazine, N,N'-bis-(3-dimethyl-aminopropyl)-urea and N,N'-bis-(3-dimethyl-aminopropyl)-oxamide.

Inclusion of the above-mentioned tertiary amino alcohols or of di-tertiary diamines in the synthesis of the oligourethanes according to the present invention is not absolutely necessary, except when the polyethylene glycol polyether used is free from tertiary amino groups. Nitrogen atoms capable of being quaternized may, of course, be introduced both by the polyethylene glycol polyether and by, for example, tertiary amino alcohols.

The total quantity of tertiary and quaternary nitrogen and nitrogen in the ammonium salt form present in the oligourethane resin should be at least about 0.3%, by weight, and is preferably from about 0.35 to 1.8%, by weight.

$C_1$ to $C_{20}$ monohydric alcohols are advantageously used as chain-breaking agents in the preparation of the oligourethanes according to the present invention. If a basic monohydric alcohol, such as dimethylamino ethanol, for example, is in any case used for introducing tertiary nitrogen atoms, this compound may take over the function of a chain-breaking agent, in which case no other monohydric alcohols need be used. The following are examples of non-basic $C_1$–$C_{20}$ monohydric alcohols: methanol, ethanol, propanol, isopropanol, 1-butanol, glycol monomethyl ether, glycol monoethyl ether, glycidol, 3-hydroxy-methyl-3-ethyl-oxetane, 2-chloroethanol, 2-bromo-ethanol, trichloroethanol, diethylene glycol monomethyl ether, 2-butanol, 2methyl-1-propanol, pentanol, 3-methyl-1-butanol, 2,2-dimethyl propanol, hexanol, 2-ethyl-1-butanol, octanol, 2-ethyl hexanol, decanol, dodecanol, tetradecanol, hexadecanol, octadecanol, fatty alcohol mixtures of the type obtainable commercially as "Lorol" or "Alfol", 2-isopropoxy ethanol, 2-butoxy ethanol, 2-(2-butoxy ethoxy)-ethanol, 2-ethyl-thioethanol, cyclohexanol, methylcyclohexanol, hydroxymethyl-cyclohexane, trimethyl-cyclohexanol and 4-tertiary butylcyclohexanol. $C_1$ to $C_6$ monohydric alcohols are preferred, particularly methanol and ethanol.

The quaternizing agents used may, in principle, be any mono-functional or di-functional alkylating agents, such as those mentioned, for example, at page 20 of German Offenlegungsschrift No. 1,770,068 and at pages 2 and 3 of German Offenlegungsschrift No. 1,300,275 (British Pat. No. 1,055,511). The following are particularly preferred: dimethyl sulphate, diethyl sulphate, epichloro-hydrin, chloroacetamide, chloroacetic acid methyl ester, chloroacetic acid ethyl ester, p-toluene-sulphonic acid methyl ester, bromoethanol, ethylene glycol, monobenzene sulphonate, dichlorobutene and dibromobutane. Quaternizing agents which are free from chlorine and bromine atoms are preferred above all others. The quantity of alkylating agent used should be at the most about 95%, preferably from about 60 to 90% of the quantity required for complete quaternization.

Particularly simple and therefore preferred according to the present invention is the formation of a salt of the tertiary amino groups in the oligourethane with inorganic or organic acids. Suitable acids for this purpose have been mentioned in German Pat. Nos. 1,178,586 (British Pat. No. 1,043,260) and 1,179,363 (U.S. Pat. No. 3,480,592). Sulphuric acid, phosphorous acid and phosphoric acid are preferred inorganic acids. They should be used in such quantities that the pH of the aqueous solution of the cationic oligourethane is not below about 5 preferably not below about 7.

This is the case when the molar quantity of these acids is not more than about 50% of the molar quantity of tertiary nitrogen atoms present.

Among the preferred organic acids are to be included the sulphonic acids of aromatic compounds, e.g. the commercially readily available naphthalene, ditolyl ether and terphenyl sulphonic acids and the condensation products thereof with formaldehyde and dihydroxy diphenyl sulphone. Other acids known as synthetic tanning agents may also be used in this connection.

Another group of preferred acids are the organic carboxylic acids having from 1 to 6 carbon atoms, e.g. acetic acid, lactic acid, glycolic acid, oxalic acid, succinic acid, glutaric acid, adipic acid, tartaric acid, citric acid or commercial mixtures thereof. When these acids are used, the pH of the aqueous oligourethane solutions again should not be below about 5, preferably not below about 7. Owing to the powerful buffering action of products obtained with these acids, the quantity of these acids may vary within a wide range and may, for example, lie above the point of equivalence. The cationic oligourethane solutions in all cases still contain some free tertiary amino groups, either due to incomplete quaternization or due to incomplete salt formation or due to partial hydrolysis of the salts obtained by reaction with the acids.

According to another preferred embodiment of the present invention, alcohols containing carboxylic acid or sulphonic acid groups or salts thereof are used for the synthesis of the oligourethanes in addition to the starting compounds mentioned above. However, the molar quantity of anionic groups introduced in this way should be smaller than that of the tertiary nitrogen atoms before quaternization.

The following are examples of such compounds: hydroxymethane and hydroxyethane sulphonic acid and salts thereof; adducts of sulphurous acid and unsaturated alcohols, such as allyl alcohol, methallyl alcohol, butene-(2)-diol (1,4), butene(1)-diol (3,4), maleic acid-bis-glycol esters and alkoxydation products of these alcohols; glycolic acid, lactic acid, dimethylpropionic acid and dimethyl butyric acid and salts thereof.

Synthesis of the oligourethanes may be carried out, for example, by first reacting the polyethylene glycol ether with the polyisocyanate and then reacting the resulting prepolymer with the low molecular weight isocyanate-reactive compounds, if used. It is preferred, however, to react all the starting components together (optionally also including the quaternizing agent at this stage) in a one-shot process. An inert solvent may be used if desired, but the process is preferably carried out solvent free.

When preparing oligourethanes exclusively from difunctional or higher functional components, an NCO-/OH ratio of from about 0.4 to 0.8, preferably from about 0.5 to 0.7, is observed in order to obtain the desired low molecular weight. If mono-functional chain-terminating agents are used, the NCO/OH ratio observed is from about 0.5 to 1.0, preferably from about 0.6 to 0.9 Oligourethanes which contain at least a proportion of OH end groups are preferred.

The oligourethanes obtained in this way, which are free from isocyanate groups, are methylolated in the presence of water with formaldehyde, paraformaldehyde or other compounds which split of formaldehyde. The molar quantity of formaldehyde used amounts to about 20 to 120%, preferably from about 30 to 70%, of the molar quantity of urethane groups present. A larger excess of formaldehyde could, of course, be employed, but has no advantages. A suitable method of carrying out this methylolation consists of stirring an aqueous formaldehyde solution, at room temperature or at temperatures of from about 30° to 80° C., into the basic oligourethane, which may be quaternized or neutralized, and then diluting the product with water. Alternatively, methylolation may be carried out by adding formaldehyde as the last step of the reaction to the previously prepared aqueous solution of the oligourethane. Methylolation is assisted and the quantity of free formaldehyde reduced by stirring the aqueous solution of the reactants for several hours at from about 30° to 90° C.

According to the present invention, the oligourethanes are generally used as tanning liquors in the form of from about 0.1 to 50%, preferably from about 1 to 20%, aqueous solutions.

The treatment of the leather or pelts with the tanning liquors according to the present invention may be carried out in any known apparatus, such as tanning vats, tanning mixers, the tanning apparatus manufactured by Hagspiel (Federal Republic of Germany) or in machines, such as Staromat ® and Coretan ®. The process according to the present invention is generally carried out at temperatures of from about 10° to 90° C., preferably from about 30° to 60° C.

Dyes are absorbed very uniformly on leather which has been treated with the products according to the present invention. The consumption of anionic dyes from the liquor is excellent. Brilliant and intense dyeings are obtained.

Leathers which have been tanned according to the present invention may be dressed or finished by any known method. They are flexible, pleasant to the skin, porous, soft and white, and if aliphatic oligourethanes are used they are also light-fast. Owing to the white background, highly brilliant colors may be obtained on the leather.

In the sum total of the properties thereof, leathers which have been tanned with the cationic oligourethanes according to the present invention and dyed are superior to those which have been manufactured from comparable oligourethanes containing no cationic groups and without the particular highly hydrophilic polyethers.

The following Examples serve to illustrate the present invention. (Figures given for the parts denote parts, by weight, or percentages, by weight, unless otherwise indicated).

EXAMPLES

Examples 1 to 7

The following mixture of hydroxy-functional compounds is introduced into a reaction vessel at room temperature: 492 g (0.8 mol) of a polyoxyethylene glycol having a molecular weight ($\overline{M}n$) of 615, 23.8 g (0.2 mol) of N-methyl-diethanolamine and 19.2 g (0.6 mol) of methanol.

The quantity of 1,6-diisocyanatohexane indicated in the Table is added and the mixture is heated, if necessary, to 80° C. until no more free isocyanate groups may be detected. A solution of 3.3 g of crude commercial glutaric acid in 200 g of water and 65 g of a 37% aqueous formaldehyde solution (0.8 mol) are then added and the mixture is finally diluted with water to a solids content (including formaldehyde) of 55%.

| Example | 1 | 2 | 3 | 4 | 5 | 6 | 7 |
|---|---|---|---|---|---|---|---|
| 1,6-diiso-cyanato-hexane (g) | 117.6 | 134.4 | 151.2 | 168.0 | 184.8 | 201.6 | 215.0 |
| (mol) | 0.7 | 0.8 | 0.9 | 1.0 | 1.1 | 1.2 | 1.28 |
| ph | 7.6 | 7.8 | 7.3 | 7.3 | 7.3 | 7.5 | 7.6 |

Example 8

The procedure is the same as in Example 2, but 53.4 g (0.6 mol) of dimethylaminoethanol are used instead of methanol.

46.2 g of crude commercial glutaric acid are used as a neutralizing component. The clear, aqueous solution obtained as a thin liquid has a pH of 7.5.

Example 9

The following components are reacted analogously to Example 1:
615 g (1 mol) of a polyoxyethylene glycol, m. wt. ($\overline{M}n$) 615,
53.4 g (0.6 mol) of dimethylaminoethanol, 134.4 g (0.8 mol) of 1,6-diisocyanatohexane,
36.2 g of crude commercial glutaric acid and
65 g of a 37% aqueous formaldehyde solution.

The solvent free liquid is diluted with water to a solids content of 54% (pH=7.0).

Example 10

The following components are reacted analogously to Example 1:
492 g (0.8 mol) of a polyoxyethylene glycol, m. wt. ($\overline{Mn}$) 615,
23.8 g (0.2 mol) of N-methyl-diethanolamine,
30 g (0.3 mol) of cyclohexanol,
9.6 g (0.3 mol) of methanol,
134.4 g (0.8 mol) of 1,6-diisocyanatohexane,
3.3 g of commercial glutaric acid and
65 g of a 37% aqueous formaldehyde solution.

The solvent free liquid is diluted with water to a solids content of 54% (pH=7.3).

Example 11

The procedure is the same as in Example 9, but instead of glutaric acid, carbonic acid is used for neutralization by adding 50 g of solid carbon dioxide (carbon dioxide snow) to the previously prepared aqueous solution. A steam of gaseous carbon dioxide is then passed through the solution for 2 hours.(pH=7.7).

Example 12

Example 2 is repeated and an 80% aqueous solution of the product is prepared (pH=7.6).

Example 13

The following components are reacted analogously to Example 1:
349 g (0.6 mol) of a polyethylene oxide (OH number 289) which has been started on triethanolamine,
19.2 g (0.6 mol) of methanol,
134.4 g (0.8 mol) of 1,6-diisocyanatohexane
11,6 g of glutaric acid (technical grade) and 65 g of 37% aqueous formaldehyde solution.

The solvent free liquid is diluted with water to a solids content of 54% (pH=7.4).

Examples 14 to 18

Example 2 is repeated using different quantities of formaldehyde:

| EXAMPLE | 2 | 14 | 15 | 16 | 17 | 18 |
|---|---|---|---|---|---|---|
| Formaldehyde (mol) | 0.8 | 0.7 | 0.6 | 0.5 | 0.4 | 0.3 |
| (g) | 24 | 21 | 18 | 15 | 12 | 9 |
| % formaldehyde | 3.5 | 3.0 | 2.6 | 2.2 | 1.75 | 1.3 |
| pH | 7.5 | 7.5 | 7.5 | 7.4 | — | — |

Example 19

The procedure is the same as in Example 15 and the solvent free liquid is diluted with water to a solids content of 80% (pH=8).

Example 20

The procedure is the same as in Example 2, but instead of 19.2 g of methanol, a mixture of 54 g (0.2 mol) of stearyl alcohol and 12.8 g (0.4 mol) of methanol is used as chain-breaking agent. When the solvent-free liquid is diluted to a solids content of 54%, a highly viscous paste is obtained which may be diluted with water to form a hydrosol (pH=7.3).

Example 21

The procedure is the same as in Example 2, but instead of 3.3 g of glutaric acid, 2.2 g of an 85% orthophosphoric acid are used for neutralization (pH=7.5).

Example 22

Example 2 is repeated, using 12.5 g of 40% metaphosphoric acid (pH=7.5).

Example 23

Example 2 is repeated, using 34 g of 5% sulphuric acid (pH=7.5).

Example 24

Example 2 is repeated, but without glutaric acid. When the solvent-free liquid is free from isocyanate groups, 90% of the tertiary amino groups are quaternized using 16.8 g of chloroacetamide (0.18 mol) at 80° C. for 3 hours. Formaldehyde is then added and the liquid is diluted with water in the conventional manner (pH=8.3).

Example 25

The following mixture of hydroxy functional compounds is introduced into the reaction vessel at from 40° to 50° C.:
492 g (0.8 mol) of a polyoxyethylene glycol, m. wt. ($\overline{Mn}$) 615,
41 g (0.1 mol) of the adduct of 3.8 mol of propylene oxide and 1 mol of 1.4-dihydroxy butane-2-sulphonic acid sodium,
11.9 g (0.1 mol) of N-methyl-diethanolamine and
19.2 g (0.6 mol) of methanol.

134.4 g (0.8 mol) of 1,6-diisocyanatohexane are added and the mixture is left to react for about 30 minutes at from 80° to 82° C. until the solvent-free liquid is free from isocyanate groups (IR spectrum). 10 g (0.08 mol) of dimethyl sulphate are then added dropwise to quaternize 80% of the tertiary amino groups. After a further 30 minutes stirring at 80° C., 605 g of water containing 24 g of formaldehyde are stirred in. A 54% aqueous solution of the oligourethane (pH=7.1) is obtained.

Example 26

The procedure is analogous to that of Example 24, but 22.7 g of dimethyl sulphate are used as quaternizing agent instead of chloroacetamide (pH=6.9).

Comparison Experiment 1

The procedure is the same as in Example 2, but without subsequent partial neutralization of the tertiary amino groups. The 54% aqueous solution has a pH of 9.

Comparison Experiment 2

The procedure is the same as in Example 2, but with the addition of 36 g (0.6 mol) of urea instead of methanol. (pH=7.4).

Example 27

In a tanning flask, approximately 200 g of preserved calf pelt in 200 g of water are tanned for 24 hours at room temperature using 10% (based on the dry substance) of a product prepared according to Example 21. The leather obtained from this process has a shrinkage temperature of 85° C. (as compared with 63° C. of the untreated pelt).

The tanned leather dried to a white color.

The products from the following Examples were tested analogously and the following shrinkage temperatures were found:

| Example | % of dry substance based on the weight of pelt | Shrinkage temperature (°C.) |
| --- | --- | --- |
| 22 | 10 | 86 |
| 23 | 10 | 88 |
| 24 | 10 | 87 |
| 25 | 10 | 88 |
| 26 | 10 | 87 |
| 1 | 10 | 86 |
| 2 | 10 | 87 |
| 3 | 10 | 86 |
| 4 | 10 | 85 |
| 5 | 10 | 84 |
| 6 | 10 | 85 |
| 7 | 10 | 85 |
| 8 | 10 | 84 |
| 9 | 10 | 84 |
| 10 | 10 | 87 |
| 11 | 10 | 84 |
| 12 | 10 | 87 |
| 13 | 10 | 89 |
| 14 | 10 | 85 |
|  | 20 | 90 |
| 15 | 10 | 85 |
|  | 20 | 89 |
| 16 | 10 | 84 |
|  | 20 | 89 |
| 17 | 10 | 82 |
|  | 20 | 88 |
| 18 | 10 | 80 |
|  | 20 | 87 |
| 19 | 10 | 86 |
| 20 | 10 | 85 |
| Comparison Experiment 2 | 10 | 75 |

Example 28

(A) 1% of a product according to Example 15 and 1% of a 90% greasing agent based on chloroparaffin were added to half a cow hide which had been de-limed by the conventional process and the hide was left in the vat with 30% liquor for 1 hour. It was then pickled and chrome tanned in the same bath in the conventional manner.

(B) The other half of the hide was treated analogously, but without the product according to the present invention.

The half treated in Experiment (A) was softer and had a firmer grain than the half treated in Experiment (B).

While Experiment (A) was being carried out, the sample was tested for the presence of dichlorodimethyl ether (DCMA) after the addition of the pickling substances. No DCMA could be detected gas chromatographically or by mass spectroscopy. Limit of detection of the method: 100 ppb.

Example 29

A sample was pre-tanned and finished analogously to Example 28 for comparison with glutaric dialdehyde. Results:
With product according to the present invention:
Surface Yield: +4%
Tear resistance 207 (with glutaric dialdehyde 170) kg/cm$^2$.

Tear propagation resistance 37 (as against 30) kg/cm.
Resistance to tearing by stitching 69 (as against 59) kg/cm.

Example 30

(A): A pared chromed neat's leather was neutralized in the vat in the conventional manner and washed. 3% of a product according to Example 2 were added at 40° C. and the leather was left to stand in the vat for 30 minutes. It was then dyed in the same bath using 1% of an acid substantive leather dye and greased and acidified in the conventional manner.

(B): The other leather half used for comparison was treated with analogous quantities of a commercial tanning auxiliary based on a protein hydrolysate.

The leather obtained in Experiment (A) had a deeper color than that obtained in Experiment (B). The following ⊖ values were found in the dyeometer:
(A): 100
(B): 88

Example 30 (A) was repeated with the products from Examples 1 to 7, 9 and 24. The following ⊖ values were obtained.

| Example | ⊖ |
| --- | --- |
| 1 | 88 |
| 3 | 90 |
| 4 | 88 |
| 5 | 81 |
| 6 | 82 |
| 7 | 83 |
| 9 | 89 |
| 24 | 102 |

Extraction of the dye bath by the product manufactured in the Comparison Experiment 1 is comparable to that by the leather treated according to Example 30 (A), but the levelling of the dyeing is distinctly inferior.

Example 31

(A): 6% of a product according to Example 9 are added to a pared chromed neat's leather and in the same bath the leather is neutralized to pH 4.5 and dyed, greased and re-tanned in the conventional manner.

(B): Comparable halves were treated analogously with a retanning substance containing chromium.

There was no difference between (A) and (B) in the depth of color, brilliance and levelling. This is an advantage in view of the environmental pollution caused by effluent which contains chromium.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Water-soluble oligourethanes which contain methylol groups and are free from isocyanate groups and have a molecular weight, between about 600 and 5,000, produced by a process comprising reacting
(a) polyethylene glycol ethers having a molecular weight between about 400 and 1,500,
(b) polyisocyanates, (c) optionally compounds having a molecular weight below about 300 which are mono-functional or poly-functional in the reaction thereof with isocyanates and (d) formaldehyde, characterized in that components (a) and/or (c) together contain a total of from about 20 to 200 milliequivalents of tertiary nitrogen atoms per 100 g of oligourethane solids content, from about 20 to 95% of which nitrogen atoms have been converted into quaternary ammonium nitrogen or into ammonium salt form by treatment with alkylating agents and/or acids and the resultant oligourethane contains from about 40 to 90% by weight of component (a).

2. Oligourethanes according to claim 1, wherein the resultant oligourethane contains from about 60 to 80%, by weight of component (a).

3. Oligourethanes according to claim 1, wherein components (a) and/or (c) contain a total of from about 30 to 100 milliequivalents of tertiary nitrogen atoms per 100 g of oligourethane solids content, from about 60 to 90% of which nitrogen atoms have been converted into quaternary ammonium nitrogen or into ammonium salt form by treatment with alkylating agents and/or acids.

4. Oligourethanes according to claim 1, wherein the tertiary nitrogen atoms have been partially converted into ammonium salt form by treatment with acids selected from the group consisting of sulphuric acid, phosphorous acid, phosphoric acid, organic carboxylic acids and organic sulphonic acids.

5. Oligourethanes according to claim 1 containing sulphonate and/or carboxylate groups.

6. Oligourethanes according to claim 1, wherein the polyisocyanates are selected from the group consisting of 1,6-diisocyanatohexane, 1,4-diisocyanatobutane and 1-isocyanato-3,3,5-trimethyl-5-isocyanatomethylcyclohexane.

7. Oligourethanes according to claim 6, wherein the polyisocyanate is 1,6-diisocyanatohexane.

8. Process for tanning or re-tanning pelts or leather with aqueous liquors which contain oligourethanes, characterized in that pelts or leather are treated with an aqueous solution of oligourethanes according to claim 1 and the pH of said solution is between about 5 and 10.

9. The process according to claim 8, wherein the pH of the aqueous liquor is between about 7 and 8.

10. In a process for tanning or re-tanning pelts or leather with aqueous liquors containing oligourethanes which contain hydrophilic polyethylene glycol polyethers and methylol groups, the improvement wherein the oligourethanes contain cationic centers which are obtained by the reaction of a tertiary nitrogen atom with a quaternizing agent and/or an acid and wherein the pH of the resulting aqueous solution is between about 5 and 10.

* * * * *